United States Patent
Brody et al.

(10) Patent No.: US 12,180,931 B2
(45) Date of Patent: Dec. 31, 2024

(54) SYSTEM AND METHOD FOR DETERMINING AN OPERATING CONDITION OF A WIND TURBINE

(71) Applicant: The AES Corporation, Arlington, VA (US)

(72) Inventors: Andrew Brody, Indio, CA (US); Fred Briggs, Ashburn, VA (US)

(73) Assignee: The AES Corporation, Arlington, VA (US)

( * ) Notice: Subject to any disclaimer, the term of this patent is extended or adjusted under 35 U.S.C. 154(b) by 0 days.

(21) Appl. No.: 18/134,615

(22) Filed: Apr. 14, 2023

(65) Prior Publication Data

US 2023/0250806 A1 Aug. 10, 2023

Related U.S. Application Data

(63) Continuation-in-part of application No. 16/599,255, filed on Oct. 11, 2019, now abandoned.

(60) Provisional application No. 63/331,556, filed on Apr. 15, 2022.

(51) Int. Cl.
*F03D 17/00* (2016.01)

(52) U.S. Cl.
CPC .......... *F03D 17/00* (2016.05); *F05B 2260/80* (2013.01); *F05B 2270/8041* (2013.01); *F05B 2270/821* (2013.01)

(58) Field of Classification Search
CPC .............. F05B 2260/80; F05B 2270/21; F05B 2270/8041; F05B 2270/821; F03D 17/00; F03D 17/001; F03D 17/012

See application file for complete search history.

(56) References Cited

U.S. PATENT DOCUMENTS

| | | | |
|---|---|---|---|
| 6,966,754 B2 * | 11/2005 | Wobben | F03D 17/00 416/61 |
| 7,004,724 B2 * | 2/2006 | Pierce | F03D 7/0204 416/61 |
| 7,160,083 B2 | 1/2007 | Pierce et al. | |
| 7,437,264 B2 | 10/2008 | Pierce et al. | |
| 8,041,540 B2 | 10/2011 | Kerber et al. | |

(Continued)

FOREIGN PATENT DOCUMENTS

| | | | |
|---|---|---|---|
| CN | 202615211 U | * | 12/2012 |
| WO | 2016/169963 A1 | | 10/2016 |

OTHER PUBLICATIONS

Machine translation of CN 202615211 (Year: 2012).*

(Continued)

*Primary Examiner* — David E Sosnowski
*Assistant Examiner* — Jason G Davis
(74) *Attorney, Agent, or Firm* — Morgan, Lewis & Bockius LLP

(57) ABSTRACT

An exemplary system for determining an operating condition for a wind turbine having a rotor, generator, and gearbox, includes a plurality of sensors mounted within the nacelle of the wind turbine. The system also includes a pair proximity sensors are mounted adjacent to the rotor for measuring rotor displacement. A first processor is connected to receive sensor data from the pair of proximity sensors and is configured to partition the received sensor data into predefined datasets, and a second processor configured to format the predefined datasets for transmission over a network to a processing computer.

23 Claims, 14 Drawing Sheets

(56) References Cited

U.S. PATENT DOCUMENTS

| | | |
|---|---|---|
| 8,398,369 B2 | 3/2013 | Rebsdorf et al. |
| 9,458,835 B2 | 10/2016 | Ikeda et al. |
| 9,567,978 B2 | 2/2017 | Marwaha et al. |
| 9,683,553 B2 | 6/2017 | Mashtare et al. |
| 9,915,585 B2 | 3/2018 | Pettersson |
| 10,371,123 B2 | 8/2019 | Kammer |
| 2004/0108732 A1 | 6/2004 | Weitkamp |
| 2004/0151578 A1 | 8/2004 | Wobben |
| 2006/0070435 A1 | 4/2006 | Lemieux et al. |
| 2009/0129924 A1 | 5/2009 | Rebsdorf et al. |
| 2009/0153656 A1 | 6/2009 | Sharonova |
| 2010/0133818 A1 | 6/2010 | Kinzie et al. |
| 2011/0135475 A1 | 6/2011 | Ahmann |
| 2011/0142593 A1 | 6/2011 | Hoffmann et al. |
| 2012/0025526 A1 | 2/2012 | Luo et al. |
| 2012/0271477 A1 | 10/2012 | Okubu et al. |
| 2014/0103652 A1 | 4/2014 | Ubben et al. |
| 2017/0037832 A1 | 2/2017 | Friedrich et al. |
| 2017/0175709 A1 | 6/2017 | Daher Adegas et al. |
| 2018/0328345 A1 | 11/2018 | Rogg |
| 2019/0297274 A1 | 9/2019 | Gharabegian |
| 2021/0108618 A1 | 4/2021 | Brody et al. |
| 2021/0115904 A1 | 4/2021 | Veldkamp et al. |

OTHER PUBLICATIONS

Sheng et al., "Wind Turbine Drivetrain Condition Monitoring During GRC Phase 1 and Phase 2 Testing", National Renewable Energy Laboratory, Technical Report, NREL/TP-5000-52748, Oct. 2011, 59 pages.

International Search Report and Written Opinion issued on Jan. 5, 2021 in PCT/US2020/054493.

International Search Report and Written Opinion of related Patent Application No. PCT/US23/18589 dated Jul. 3, 2023.

Office Action with partial translation, dated Jul. 23, 2023, issued in related Chilean Patent Application No. 202200918.

Extended European Search Report dated Oct. 16, 2023, issued in related European Patent Application No. 20873755.1.

Office Action (with partial translation) dated Apr. 15, 2024, issued in corresponding Brazilian Patent Application No. 112022006966-9.

\* cited by examiner

SYSTEM AND METHOD FOR DETERMINING AN OPERATING CONDITION OF A WIND TURBINE

RELATED APPLICATION DATA

This application is a Continuation-in-Part of U.S. application Ser. No. 16/599,255, filed Oct. 11, 2019, and this application is also based on and claims priority under 35 U.S.C. § 119 to U.S. Provisional Application No. 63/331,556, filed Apr. 15, 2022, the entire contents of each of these applications are incorporated herein by reference.

FIELD OF THE DISCLOSURE

The present disclosure relates to determining an operating condition of a wind turbine, and particularly, determining an operating condition of a wind turbine based on sensor data measured within the nacelle.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

At wind farms or sites where one or more wind turbines are operated it is difficult to detect the condition of a wind turbine prior to a catastrophic failure occurring. The only way to detect or inspect the condition of the wind turbine is to have a technician physically inspect the structure and associated components prior to a failure occurring. These inspections normally cover the external structure of the wind turbine including the nacelle and require a technician to physically climb wind turbine structure. Performing a physical inspection also involves inspecting the inside of the nacelle. In nearly all instances, these inspections require that the wind turbine be taken offline, which results in the loss of a renewable energy resource.

SUMMARY

An exemplary system for determining an operating condition for a wind turbine having a rotor, generator, and gearbox is disclosed, the system comprising: a plurality of sensors mounted within the nacelle of the wind turbine; a pair proximity sensors of the plurality of sensors, the pair of proximity sensors being mounted adjacent to the rotor for measuring rotor displacement; a first processor connected to receive sensor data from the pair of proximity sensors and configured to partition the received sensor data into predefined datasets; and a second processor configured to format the predefined datasets for transmission over a network to a processing computer.

Another exemplary system for determining an operating condition for a wind turbine including a nacelle having therein a rotor, a generator, and a gearbox connected to the generator by a coupling comprises a first plurality of non-contact proximity sensors that are mounted adjacent to the rotor for measuring rotor displacement in mutually orthogonal directions, a second plurality of non-contact proximity sensors that are mounted for measuring gearbox displacement in at least two orthogonal directions, a third plurality of non-contact proximity sensors that are mounted for measuring generator displacement in at least two orthogonal directions, a plurality of visual image cameras, a first visual image camera having a field of view oriented axially rearward from a main bearing toward a forward side of the gearbox and a second visual image camera having a field of view oriented toward a surface of the coupling, wherein the first visual image camera monitors vertical movement of the gearbox and the second visual image camera monitors vertical movement of the coupling, a first thermal camera having a field of view oriented toward the gearbox, and, optionally, a second thermal camera having a field of view oriented toward a hydraulic station.

In further aspects, the system further comprises a first processor connected to receive sensor data from each of the first plurality of non-contact proximity sensors, the second plurality of non-contact proximity sensors, and the third plurality of non-contact proximity sensors, wherein the first processor configured to partition the received sensor data into predefined datasets, and a second processor configured to format the predefined datasets and to transmit the formatted predefined datasets over a network to a processing computer. The first processor is connected to receive sensor data from each of the plurality of visual image cameras, the first thermal camera, and, optionally, the second thermal camera. In addition, the computing device can comprise a third processor configured to receive the predefined datasets of sensor data from the second processor and determine whether any of the displacements are outside accepted ranges In still further aspects, the processing computer is configured to process the formatted predefined datasets to analyze an operating condition of the wind turbine to determine whether a measured displacement is within an accepted range, wherein the measured displacement is one or more of a measured rotor displacement, a measured gearbox displacement, or a measured generator displacement, and wherein the processing computer is configured to notify to a user an indication of a defect when the measured displacement is not within an accepted range.

In additional aspects, the processing computer can be configured to display data from the formatted predefined dataset on a display to allow the user to select one or more of the first plurality of non-contact proximity sensors, the second plurality of non-contact proximity sensors, and the third plurality of non-contact proximity sensors for evaluating components of the wind turbine.

A method for determining an operating condition for a wind turbine having a rotor, generator, and gearbox is disclosed, the method comprising: receiving data from a plurality of sensors mounted within the nacelle of the wind turbine, at least one pair of the plurality of sensors being non-contact proximity sensors measuring rotor displacement in mutually orthogonal directions; partitioning the received sensor data into predefined datasets; formatting the predefined datasets for transmission over a network; and processing the datasets to determine whether the rotor displacement is within an accepted range.

BRIEF DESCRIPTION OF THE DRAWING

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Exemplary embodiments of the present disclosure provide a manner of wind turbines to be inspected without requiring a technician to physically climb the structure of the wind turbine. The embodiments allow various types of data to be remotely collected from the turbine so that the operating status and condition of various components can be determined.

Figure 1:
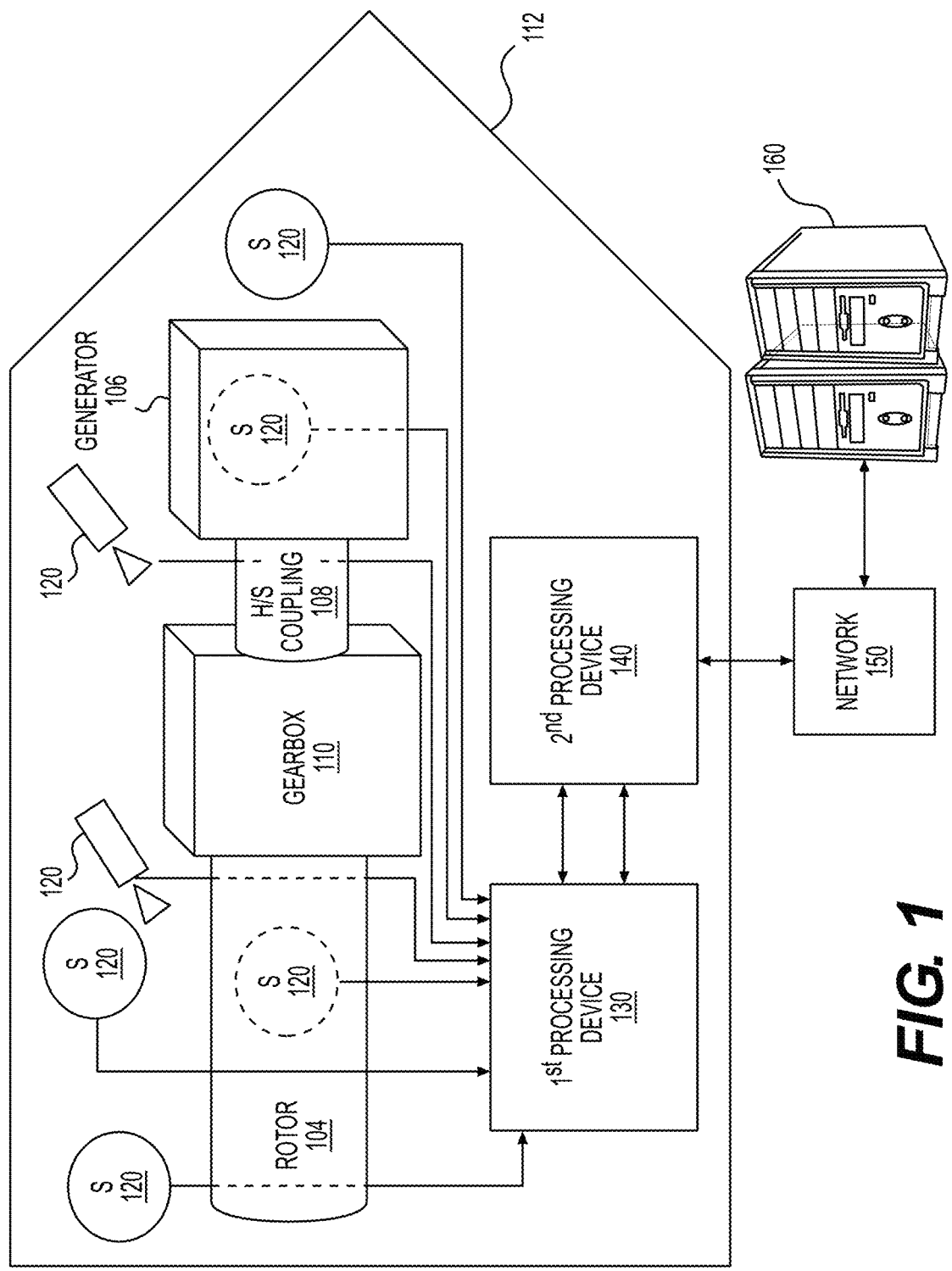
FIG. 1 is a block diagram illustrating a system architecture in accordance with an exemplary embodiment of the present disclosure.

FIG. 1 is a block diagram illustrating a system architecture in accordance with an exemplary embodiment of the present disclosure.

As shown in FIG. 1, the system 100 for determining an operating condition for a wind turbine having a rotor 104, generator 106, a high speed coupling shaft 108, and a gearbox 110. The system includes a plurality of sensors 120 mounted within a nacelle 112 of the wind turbine. The sensors 120 can include one or more non-contact proximity sensors, one or more video cameras, one or more thermal cameras, one or more gas sensors, or any other suitable sensor for measuring a parameter or condition of a wind turbine component as desired. The one or more non-contact proximity sensors can include high precision and lower precision sensors. The high precision non-contact proximity sensors can measure movement in a range of approximately 0.0029 mm. The lower precision non-contact proximity sensors can measure movement in a range of approximately 0.1000 mm.

The video cameras can be configured for surveillance and monitoring the physical components within the nacelle 112 of the wind turbine. Each video camera can include an interface for connecting to a digital or communication network via a suitable Internet protocol. The video cameras can have pan, tilt, and zoom controls which can be manipulated or adjusted remotely and can be configured to capture video images in a suitable resolution, such as, 4K, high definition, standard definition, or any other suitable resolution as desired.

The one or more thermal cameras are configured to render infrared radiation as visible light using an array of detector elements. Each thermal camera can include a lens system that focuses the infrared light onto the detector array. The elements of the detector array in combination with signal processing circuitry generate a thermogram based on the received energy.

As shown in FIG. 1, a pair of proximity sensors of the plurality of sensors can be mounted adjacent to the rotor 104 for measuring rotor displacement. A first processing device 130 connected to receive sensor data from the pair of proximity sensors 110 and configured to partition the received sensor data into predefined datasets. According to an exemplary embodiment, the first processing device 130 can be configured as an interface for collecting the real-time (e.g., live-stream) data from each of the plurality of sensors. A second processing device 140 is connected to the first processing device 130 and is configured to format the predefined datasets for transmission over a network 150 to a processing server or computer 160. The second processing device 140 can be configured to receive the sensor data as the sensor data from the first processing device 130, which is configured as an interface. According to an exemplary embodiment, the operations of the first and second processing devices 130, 140 can be achieved through a single processing or computing device. The remote computing device 160 can be configured to receive predefined datasets of sensor data from the second processing device 140 and determine whether any of the rotor displacement, the high speed coupling displacement, the generator displacement, and the gearbox displacement is outside accepted ranges. For example, the remote computing device 160 can be configured as a processing server which executes any number of algorithms and/or software applications for analyzing the sensor data according to predetermined setpoints and/or ranges for determining the operating condition or status of the wind turbine and the various components as desired. The processing server 160 can be further configured to execute an application program interface (API) or other suitable graphic display for notifying a user or operator of the results of the analysis and/or determination. The API can also be configured to display or indicate the data or component under analysis and allow an operator to select one or more of the plurality of sensors for evaluating the wind turbine and/or associated component.

Figure 2:
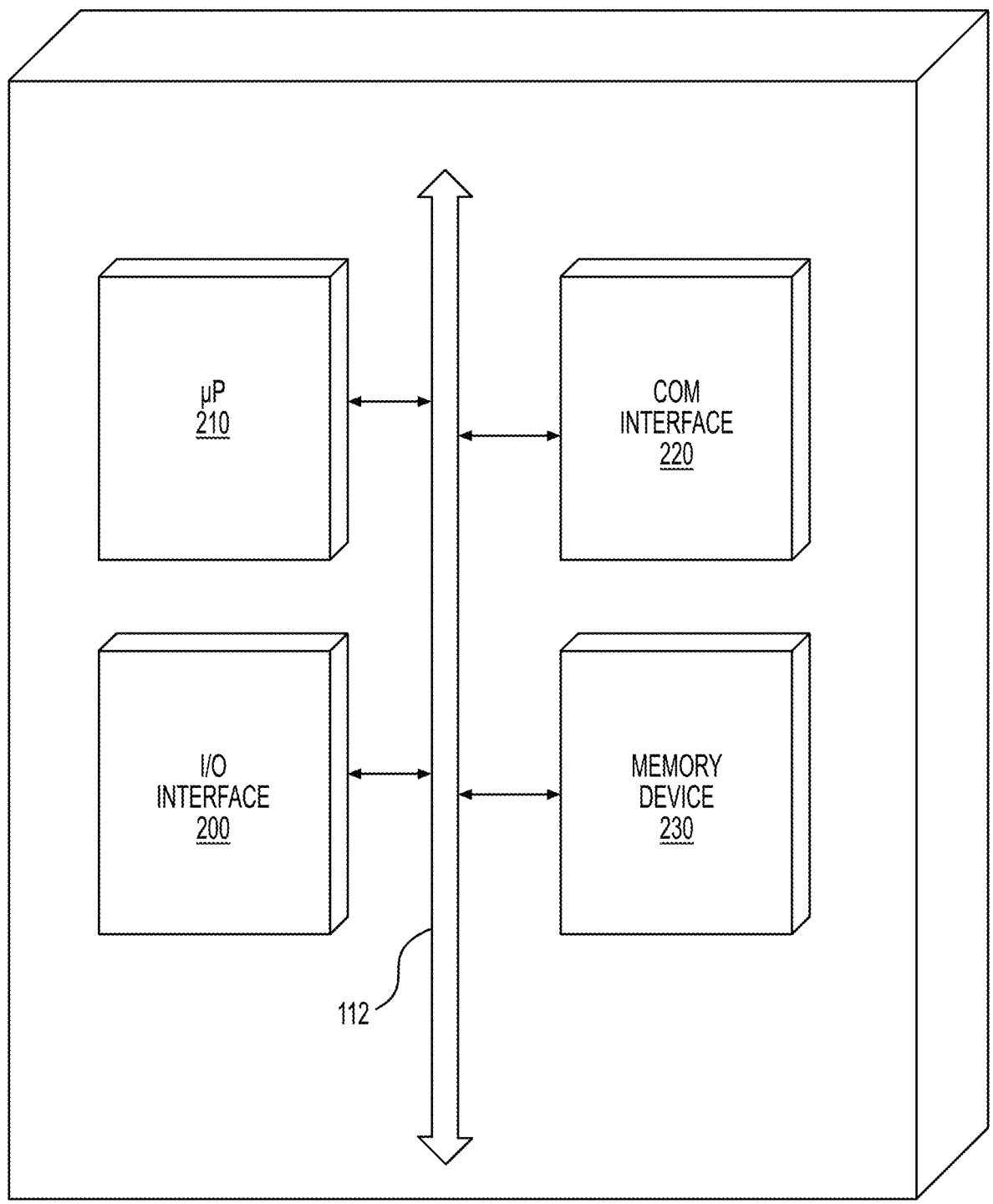
FIG. 2 is a block diagram illustrating an architecture of processing device in accordance with an exemplary embodiment of the present disclosure.

FIG. 2 is a block diagram illustrating a processing device in accordance with an exemplary embodiment of the present disclosure. As shown in FIG. 2, the computing devices 130, 140, 160 can include an input/output (I/O) interface 200, a hardware processor 210, a communication interface 220, and a memory device 230.

The I/O interface 200 can be configured to receive a signal from the hardware processor 210 and generate an output suitable for a peripheral device via a direct wired or wireless link. The I/O interface 200 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

The hardware processor 210 can be a special purpose or a general purpose processing device encoded with program code or software for performing the exemplary functions and/or features disclosed herein. The hardware processor 210 can be connected to a communications infrastructure 212 including a bus, message queue, network, multi-core message-passing scheme, for communicating with other components of the first and second processing devices 130, 140, such as the communications interface 220, the I/O interface 200, and the memory device 230. The hardware processor 210 can include one or more processing devices such as a microprocessor, central processing unit, microcomputer, programmable logic unit or any other suitable hardware processing devices as desired.

The communications interface 220 can include a combination of hardware and software components and be configured to receive data from the plurality of sensor devices 120. The communications interface 220 can include a hardware component such as an antenna, a network interface (e.g., an Ethernet card), a communications port, a PCMCIA slot and card, or any other suitable component or device as desired. The communications interface 220 can be encoded with software or program code for receiving signals and/or data packets encoded with sensor data from another device, such as a database, image sensor, image processor or other suitable device as desired. The communication interface 220 can be connected to the plurality of sensor devices via a wired or wireless network or via a direct wired or wireless link. The hardware and software components of the communication interface 220 can be configured to receive the sensor data according to one or more communication protocols and data formats. For example, the communications interface 220 can be configured to communicate over a network 150, which may include a local area network (LAN), a wide area network (WAN), a wireless network (e.g., Wi-Fi), a mobile communication network, a satellite network, the Internet, fiber optic, coaxial cable, infrared, radio frequency (RF), Modbus, I2C, or any combination thereof.

The communication interface 220 can be configured to receive the sensor data as a live data stream from one or more of the plurality of sensors. According to an exemplary embodiment, the sensor data can also be obtained as recorded or stored data from a database or memory device. During a receive operation, the receiving unit 110 can be configured to identify parts of the received data via a header and parse the data signal and/or data packet into small frames (e.g., bytes, words) or segments for further processing at the hardware processor 210.

According to an exemplary embodiment, the communications interface 220 can be configured to receive data from the processor 210 and assemble the data into a data signal and/or data packets according to the specified communication protocol and data format of a peripheral device or remote device to which the data is to be sent. The communications interface 220 can include any one or more of hardware and software components for generating and communicating the data signal over the network 150 and/or via a direct wired or wireless link to a peripheral or remote device.

Figure 3:
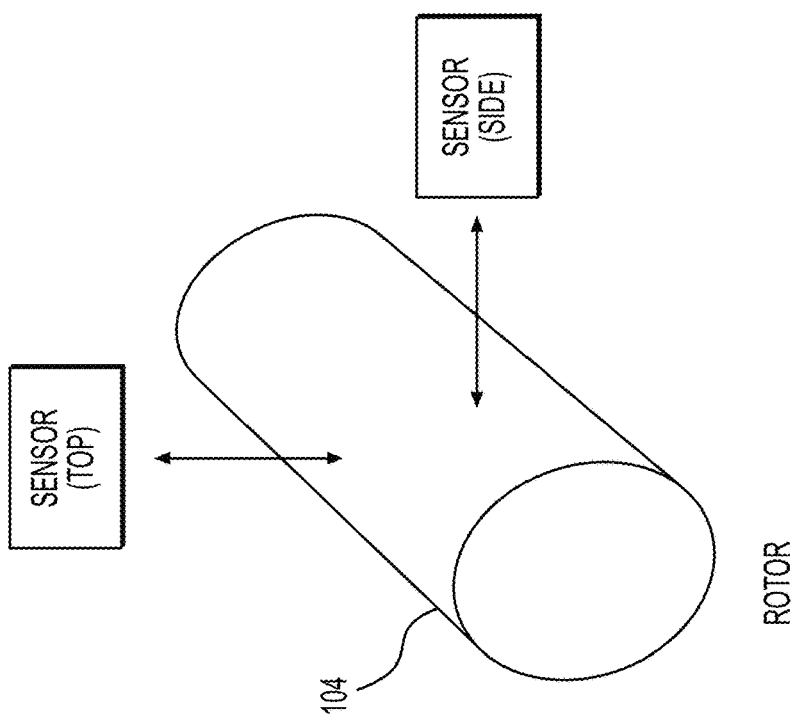
FIG. 3 is a block diagram illustrating a sensor arrangement associated with a rotor shaft in accordance with an exemplary embodiment of the present disclosure.

As already discussed, the system can include a plurality of sensor devices 120 that are arranged in various locations in the nacelle 112. FIG. 3 is a block diagram illustrating a sensor arrangement associated with a rotor in accordance with an exemplary embodiment of the present disclosure. As shown in FIG. 3, the sensors can be non-contact proximity sensors that monitor rotor displacement in two directions. For example, one sensor in the pair of non-contact proximity sensors can be positioned to monitor a balance property of the rotor 104 from a top position, and the other sensor in the pair can be positioned at a side position relative to the rotor 104.

Figure 4:
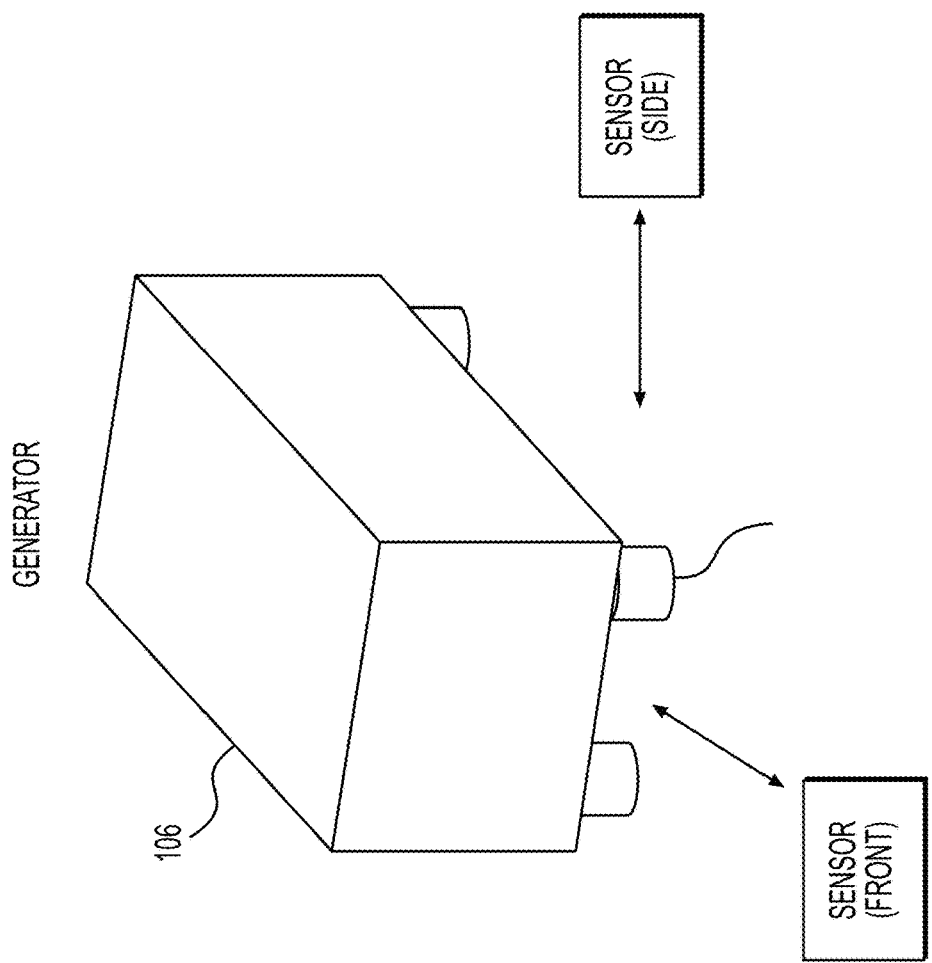
FIG. 4 is a block diagram illustrating a sensor arrangement associated with a generator in accordance with an exemplary embodiment of the present disclosure.

FIG. 4 is a block diagram illustrating a sensor arrangement associated with a generator in accordance with an exemplary embodiment of the present disclosure. As shown in FIG. 4, the plurality of sensors includes a pair of non-contact proximity sensors mounted adjacent to the generator 106 for measuring generator displacement. For example, one sensor in the pair of non-contact proximity sensors can be disposed in a front position relative to the generator 106 and the other sensor can be positioned at a side position relative to the generator 106. The non-contact proximity sensors of FIG. 4 can be disposed to monitor or detect forward, backward, and side movement of a foot 410 of the generator 106.

Figure 5:
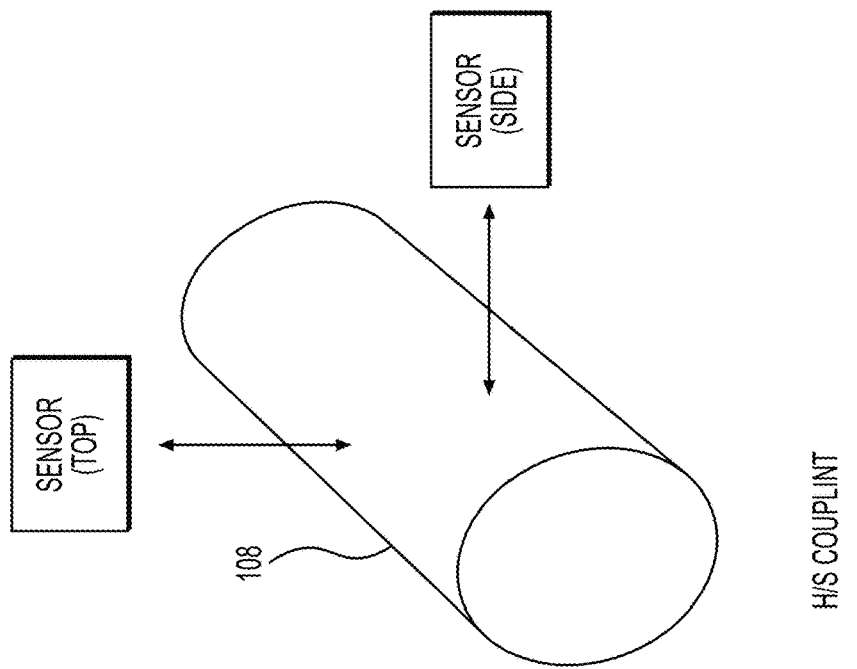
FIG. 5 is a block diagram illustrating a sensor arrangement associated with a high-speed coupling of the rotor in accordance with an exemplary embodiment of the present disclosure.

FIG. 5 is a block diagram illustrating a sensor arrangement associated with a high speed coupling shaft in accordance with an exemplary embodiment of the present disclosure. As shown in FIG. 5, the sensor arrangement includes a pair of non-contact proximity sensors arranged proximal to the high speed coupling shaft 108 of the rotor 104 and generator 106. The pair of non-contact proximity sensors includes one sensor arranged in a top position relative to the high speed coupling shaft 110 and a side position.

Figure 6:
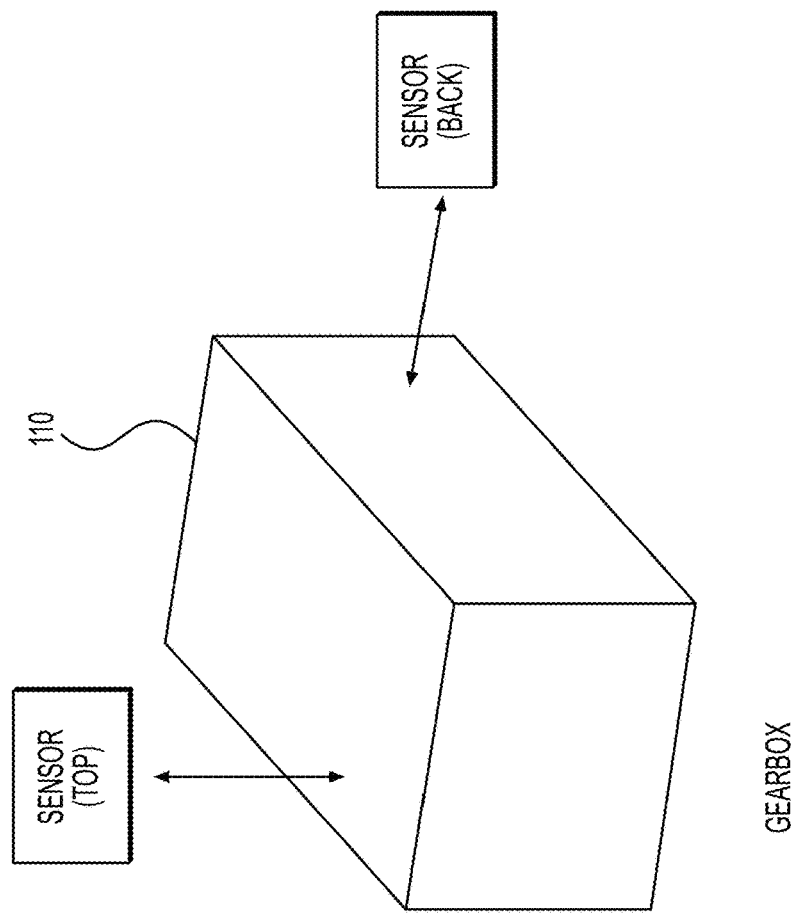
FIG. 6 is a block diagram illustrating a sensor arrangement associated with a gearbox in accordance with an exemplary embodiment of the present disclosure.

FIG. 6 is a block diagram illustrating a sensor arrangement associated with a gearbox in accordance with an exemplary embodiment of the present disclosure. As shown in FIG. 6, the plurality of sensors includes a pair of non-contact proximity sensors mounted adjacent to the gearbox 110 for measuring gearbox displacement. The pair of non-contact proximity sensors positioned to monitor forward, backward, up, and down movement of the gearbox 110. According to an exemplary embodiment of the present disclosure, one sensor in the pair can be positioned in proximity to a torque arm of the gearbox 110 to measure up and down movement. Another one of the pair of sensors can be focused on the body of the gearbox 110 to measure forward and backward movement.

As already discussed the plurality of sensors can include video cameras to provide visual monitoring and surveillance within the nacelle 112 for observing movement and/or vibration in various components of the wind turbine.

Figure 7:
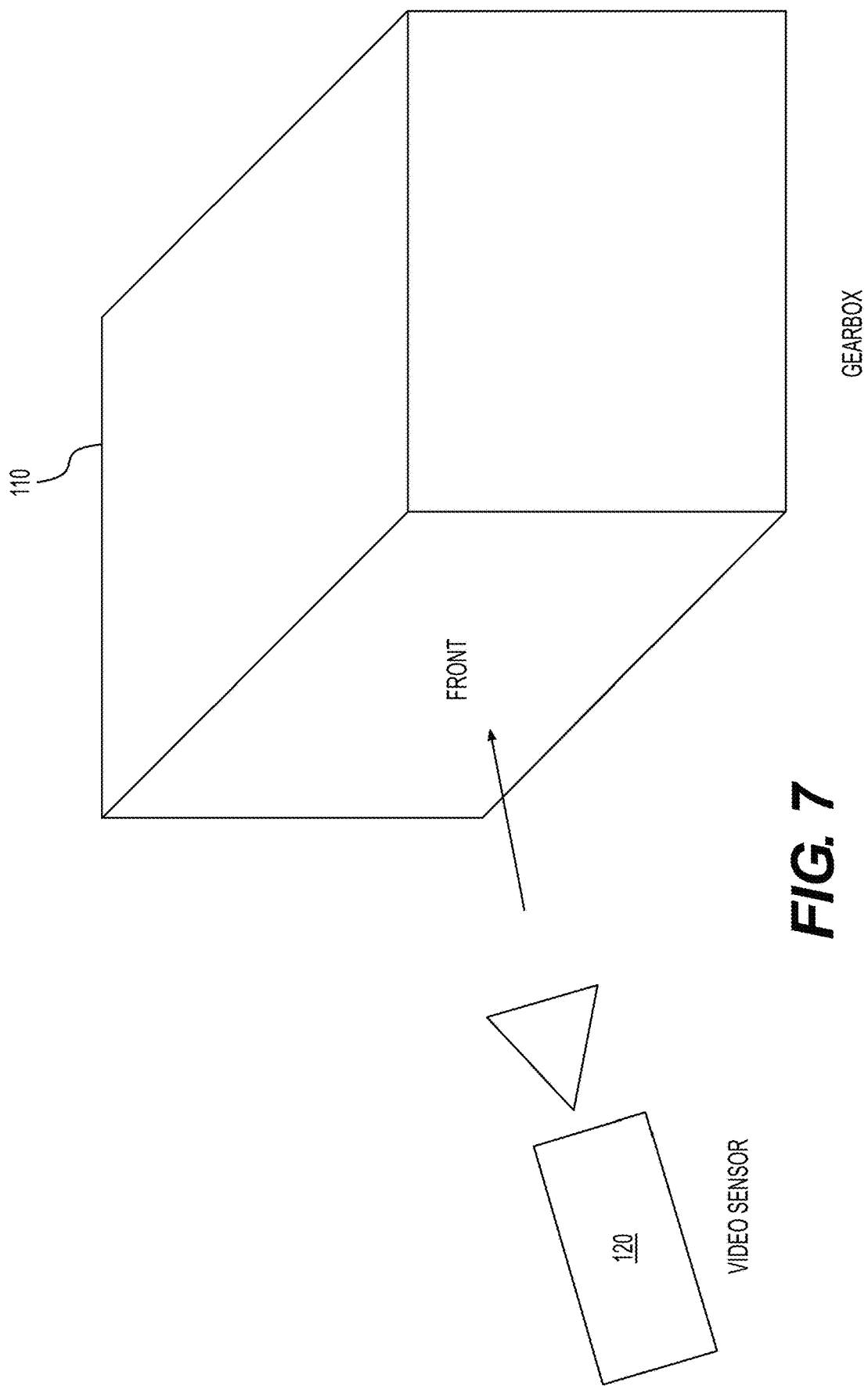
FIG. 7 is a block diagram illustrating a camera arrangement associated with a gearbox in accordance with an exemplary embodiment of the present disclosure.

FIG. 7 is a block diagram illustrating a camera arrangement associated with a gearbox in accordance with an exemplary embodiment of the present disclosure. As shown in FIG. 7, the camera is positioned to look at a front side of the gearbox 110 during operation.

Figure 8:
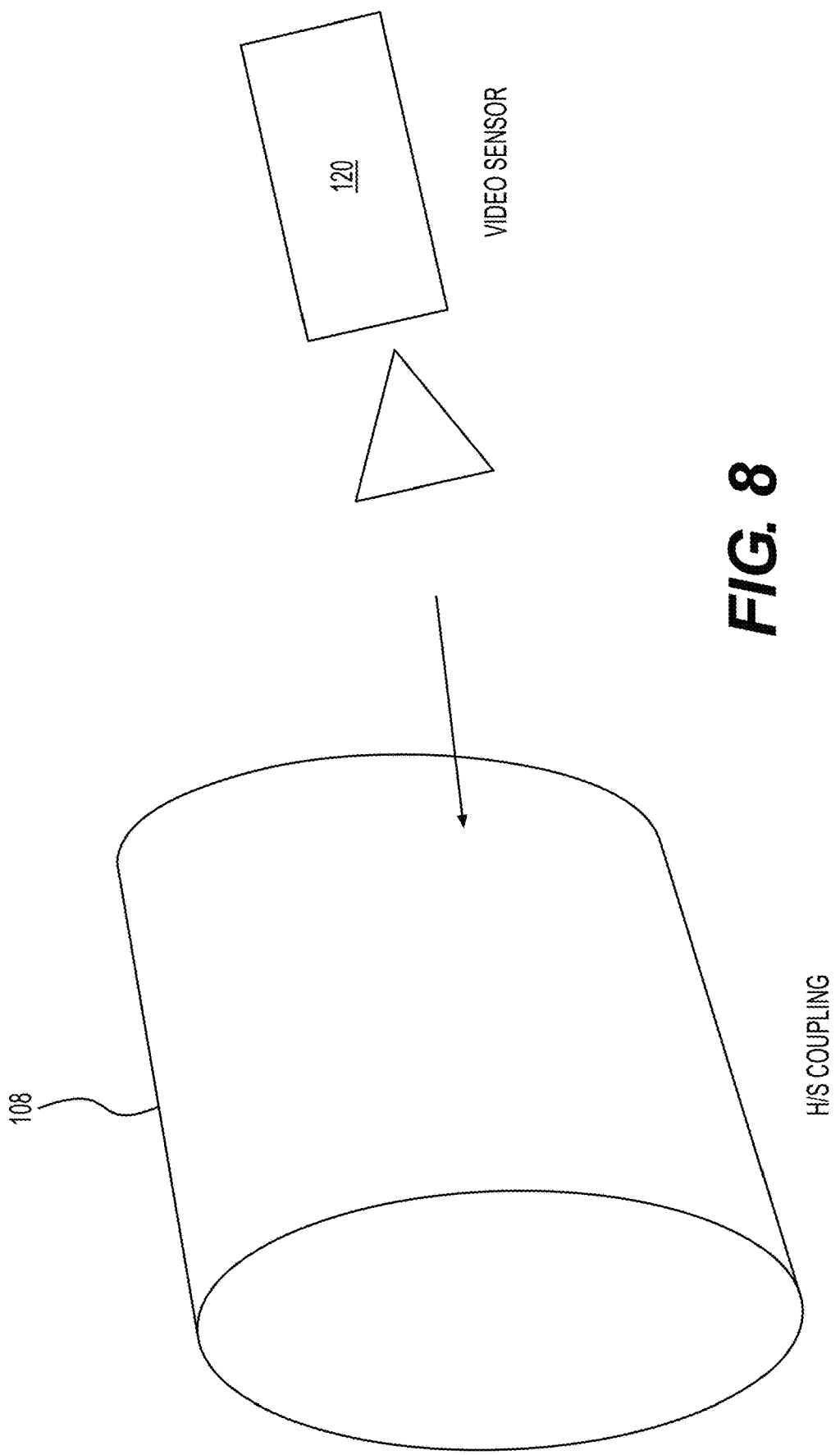
FIG. 8 is a block diagram illustrating a camera arrangement associated with a high speed coupling shaft in accordance with an exemplary embodiment of the present disclosure.

FIG. 8 is a block diagram illustrating a camera arrangement associated with a high speed coupling shaft in accordance with an exemplary embodiment of the present disclosure. As shown in FIG. 8, one or more sensors can be mounted adjacent to couplings connecting the gearbox 110 and the generator 106. The sensor can include a camera disposed to have a side vantage point of the high speed coupling shaft 108 for measuring displacement. This camera provides video data and a vantage point of the gearbox 110 which allows movement and/or vibration to be visually observed. The video cameras of FIGS. 7 and 8 can be configured to receive power over an Ethernet connection and communicate data over the Ethernet connection to the first processing device using a secure IP protocol.

Figure 9:
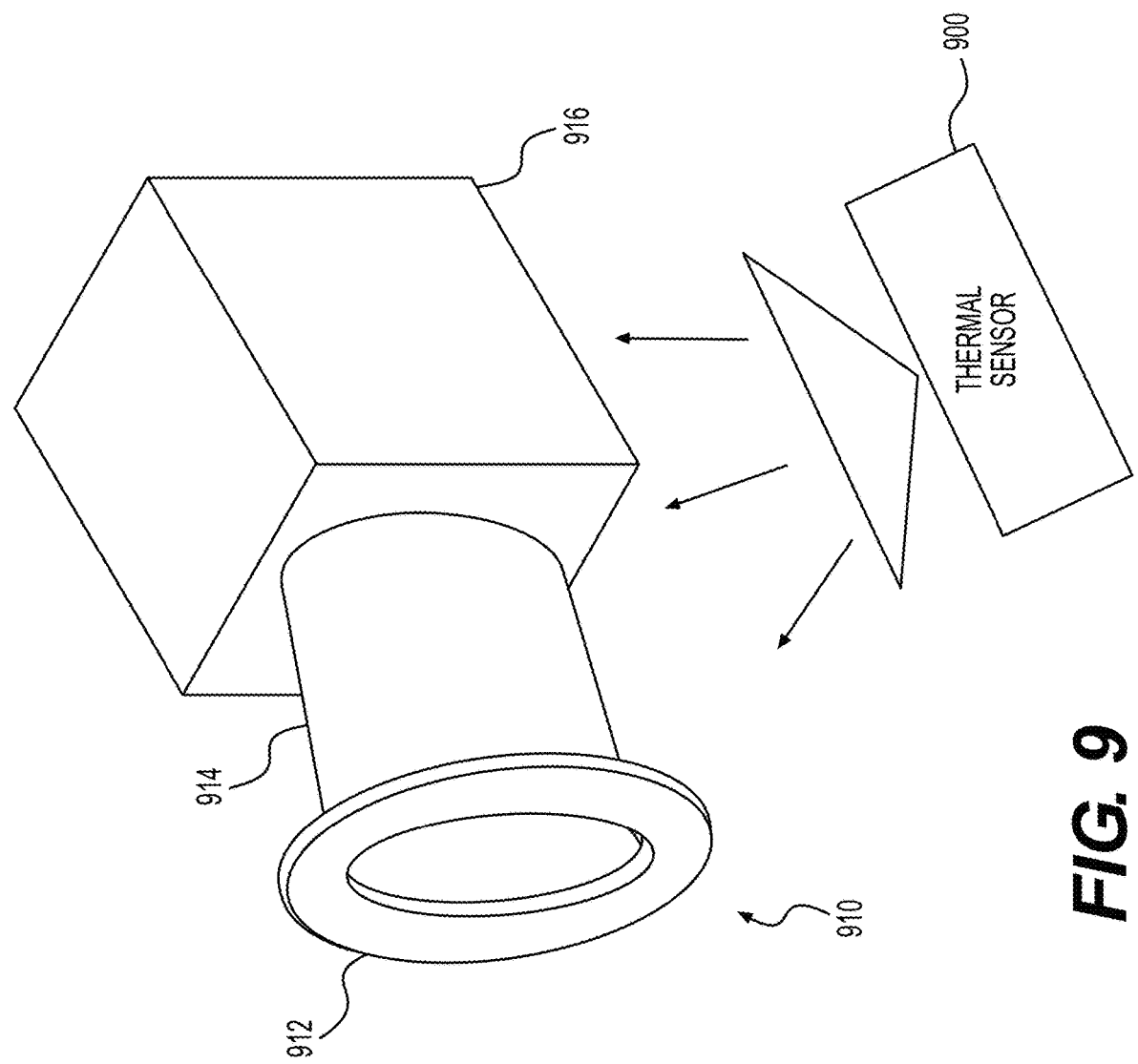
FIG. 9 is a block diagram illustrating a thermal sensor arrangement associated with a main bearing and a gearbox in accordance with an exemplary embodiment of the present disclosure.

FIG. 9 is a block diagram illustrating a thermal sensor arrangement associated with a main shaft assembly in accordance with an exemplary embodiment of the present disclosure. As shown in FIG. 9, the senor arrangement includes a thermal sensor 900 that is positioned to detect thermal radiation from the main shaft assembly 910. The main shaft assembly 910 includes a main bearing 912, a main shaft 914, and a gearbox 916.

Figure 10:
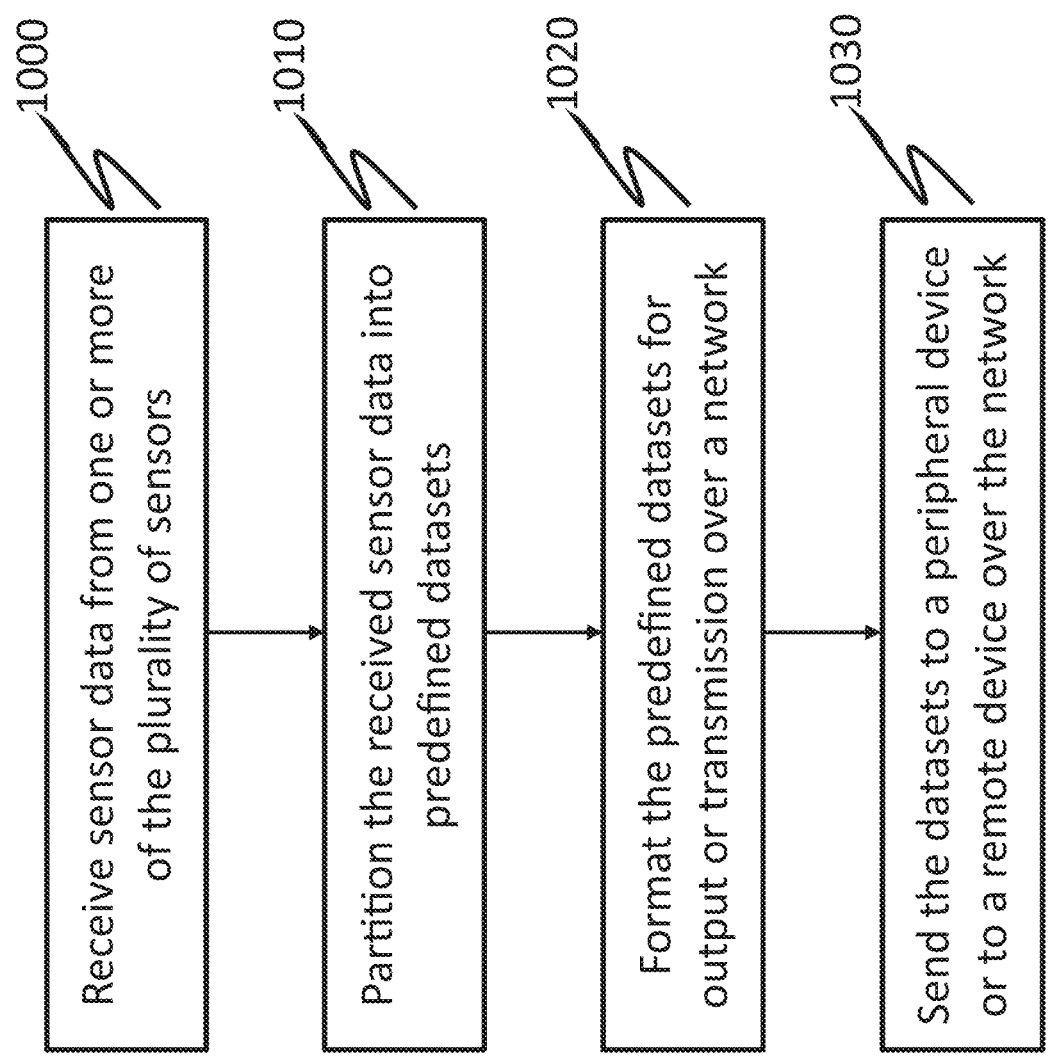
FIG. 10 is a flow diagram of a method for determining an operating condition of a wind turbine in accordance with an exemplary embodiment of the present disclosure.

FIG. 10 is a flow diagram of a method for determining an operating condition of a wind turbine in accordance with an exemplary embodiment of the present disclosure. In step 1000, the first processing device receives data from one or more of the plurality of sensors mounted within the nacelle 112 of the wind turbine. The received data is associated with one or more of rotor displacement, gearbox displacement, coupling displacement for a high speed coupling shaft 108 between the gearbox 110 and the generator 106, generator displacement, and a temperature of the main shaft assembly via a thermal image. The first processing device 130 partitions the received sensor data into predefined datasets (step 1010) and formats the predefined datasets for transmission over a network (step 1020). For example, the first processing device 130 can receive raw sensor data including measurement data and generate a header, which identifies the sensor from which the data originated. The first processing device 130 can assemble the header and measurement data according to a specified data format or protocol. According to an exemplary embodiment, the header and measurement data can be formatted into a comma delimited string with a termination character. For example, if the received sensor data originated from a sensor reading measurements associated with the high speed coupling shaft 108, the data can be formatted as follows:

"HIGHSPEED,100,120,110,120,150,92,133,!"

The header "HIGHSPEED" indicates the measurement data is from the high speed coupling shaft 108. The header is followed by the measurement data in which measurements for specified time readings are delimited by commas. The character "!", which follows the measurement data, is a terminating character indicating the end of the dataset. It should be understood that the dataset can include one or more additional data elements according to the specified protocol for communication and/or analysis.

The first processing device 130 sends the formatted datasets to the second processing device 140 for analysis. The second processing device 140 processes the datasets to determine whether the rotor displacement is within an accepted range. According to an exemplary embodiment, the second processing device 140 can execute any of a number of algorithms to analyze the received datasets and determine whether the measurement data indicates that any of the rotor 104, gearbox 110, generator 106, and/or high speed coupling shaft 108 is or has experienced displacement which is outside of accepted tolerances.

According to another exemplary embodiment, when the received sensor data includes video data, the second processing device 140 can be configured to execute image recognition and/or image analysis software for determining an operating condition of the monitored component in the image. For example, via image analysis, the second processing device 140 can be configured to determine a significance of any vibrations and/or movement in the monitored component. Moreover, the image analysis can recognize any defects or deterioration in the monitored component, such as cracks, deformities, leaks, or any other suitable deficiency in the monitored component as desired.

According to yet another exemplary embodiment, when the received sensor data includes audio data, the second processing device 140 can be configured to execute audio recognition and/or audio analysis software for determining an operating condition of the monitored component. For example, the second processing device 140 can be configured to analyze the sound patterns and determine whether any of the patterns indicate an adverse, defective, or deteriorating operating condition with respect to the monitored component when compared to baseline sound patterns.

According to an exemplary embodiment of the present disclosure, when the received sensor data includes thermal imaging data, the second processing device 140 can be configured to execute thermal analysis software for determining whether the thermal profile of the monitored component is outside of an accepted range or tolerance. Furthermore, the second processing device 140 can be configured to generate a graphic display and/or graphic representation of the thermal profile of the monitored component. According to an exemplary embodiment, the graphic display can identify specified areas or portions of the monitored component which are within and/or outside of the accepted temperature range and/or those areas that may be under increased stress.

The computer program code for performing the specialized functions described herein can be stored on a medium and computer usable medium, which may refer to memories, such as the memory devices for the first and second computing device 130, 140 and the remote computing device 160, which may be memory semiconductors (e.g., DRAMs, etc.). These computer program products may be a tangible non-transitory means for providing software to the computing devices 130, 140, and 160 disclosed herein. The computer programs (e.g., computer control logic) or software may be stored in a resident memory device 230 and/or may also be received via the communications interface 220. Such computer programs, when executed, may enable the associated computing devices and/or server to implement the present methods and exemplary embodiments discussed herein and may represent controllers of the computing device 130, 140, 160. Where the present disclosure is implemented using software, the software may be stored in a computer program product or non-transitory computer readable medium and loaded into the corresponding device 130, 140, 160 using a removable storage drive, an I/O interface 200, a hard disk drive, or communications interface 220, where applicable.

The hardware processor 210 of the computing device 100 can include one or more modules or engines configured to perform the functions of the exemplary embodiments described herein. Each of the modules or engines may be implemented using hardware and, in some instances, may also utilize software, such as corresponding to program code and/or programs stored in memory 230. In such instances, program code may be compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the computing device 130, 140, 160 to perform the functions disclosed herein. According to an exemplary embodiment, the program code can be configured to execute a neural network architecture, or machine learning algorithm wherein the image, sound, and/or thermal analysis operations can be performed according to corresponding training vectors and the neural network can learn further patterns and/or features identifying an operating condition or event from each subsequent analysis. It will be apparent to persons having skill in the relevant art that such processes result in the computing device 130, 140, 160 being a specially configured computing devices uniquely programmed to perform the functions discussed above.

Specific examples of the types and locations of various sensors associated with components of the wind turbine are described with reference to FIGS. 11 to 16.

Figure 11:
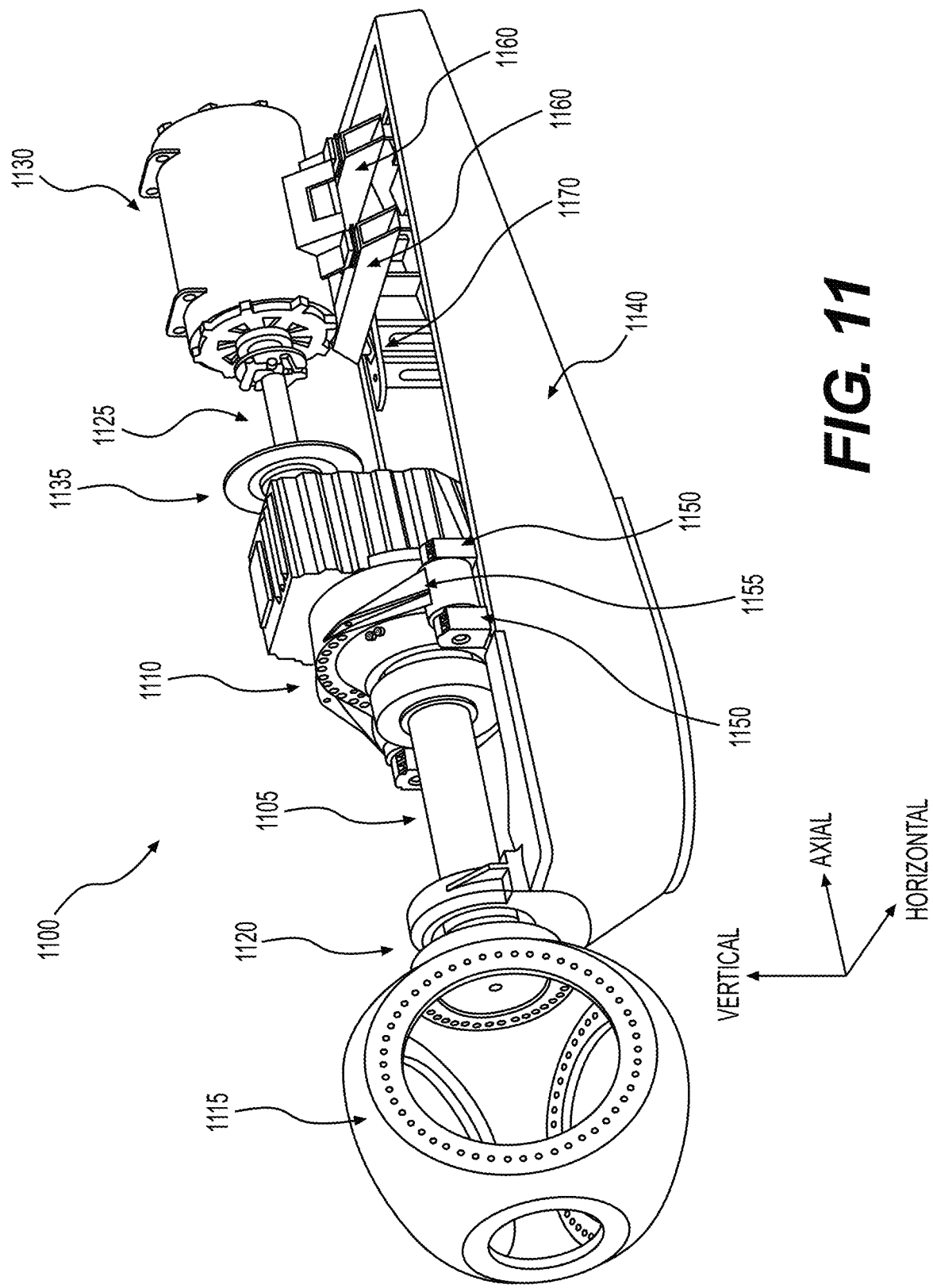
FIG. 11 is a schematic diagram showing the arrangement of components of an embodiment of a wind turbine.

FIG. 11 is a schematic diagram showing the arrangement of components of an embodiment of a wind turbine 1100. The components include a rotor 1105 that extends from the gearbox 1110 and is attached to the hub 1115. The hub 1115 is the structure to which the blades (not shown) of the wind turbine 1100 are attached. The rotor 1105 is supported for rotation in a main bearing 1120. The rotor 1105 is coupled through gearing in the gearbox 1110 to a high speed shaft 1125 and the rotor 1105 rotates at a lower speed than the high speed shaft 1125. The high speed shaft 1125 includes a first main shaft portion coupled through gearing in the gearbox 1110 to the rotor 1105, a second main shaft portion that couples to the rotor of the generator 1130 (for motion relative to the stator of the generator 1130), and a coupling shaft that connects the first main shaft portion to the second main shaft portion. A brake 1135 can be positioned at one of the connections of coupling shaft, though it is typically located where the first main shaft portion connects to the coupling shaft. The connections of the coupling shaft to the other portions of the high speed shaft 1125 are by, for example, bolts and allows disassembly of the high speed shaft and independent servicing, including replacement, of the gear box 1120 and the generator 1130. The main bearing 1120, gearbox 1110, and generator 1130 are anchored to the bedplate 1140 by suitable means, such as by directly or indirectly bolting the component to the bedplate 1140. In the illustrated example, an upper portion of the main bearing 1120 is attached to the bedplate 1140 by fasteners. Also in the illustrated example, the gearbox 1110 is attached to the bedplate 1140 by a pin mount system that inserts a pin through openings in pin housings 1150 integrated into the bedplate 1140. The pin also extends through a receiving hole in the torque arm 1155 of the gearbox 1110. In addition, in the illustrated example, the feet of the generator 1130 are attached to support beams 1160 by fasteners and the support beams are attached to the bedplate 1140 by fasteners. The wind turbine 1100 also includes ancillary equipment, such as a hydraulic station 1170 and an oil cooling system for the gearbox 1110.

Embodiments of the disclosed system for determining an operating condition for a wind turbine incorporates various sensor types at different locations within the nacelle of the wind turbine.

Figure 12:
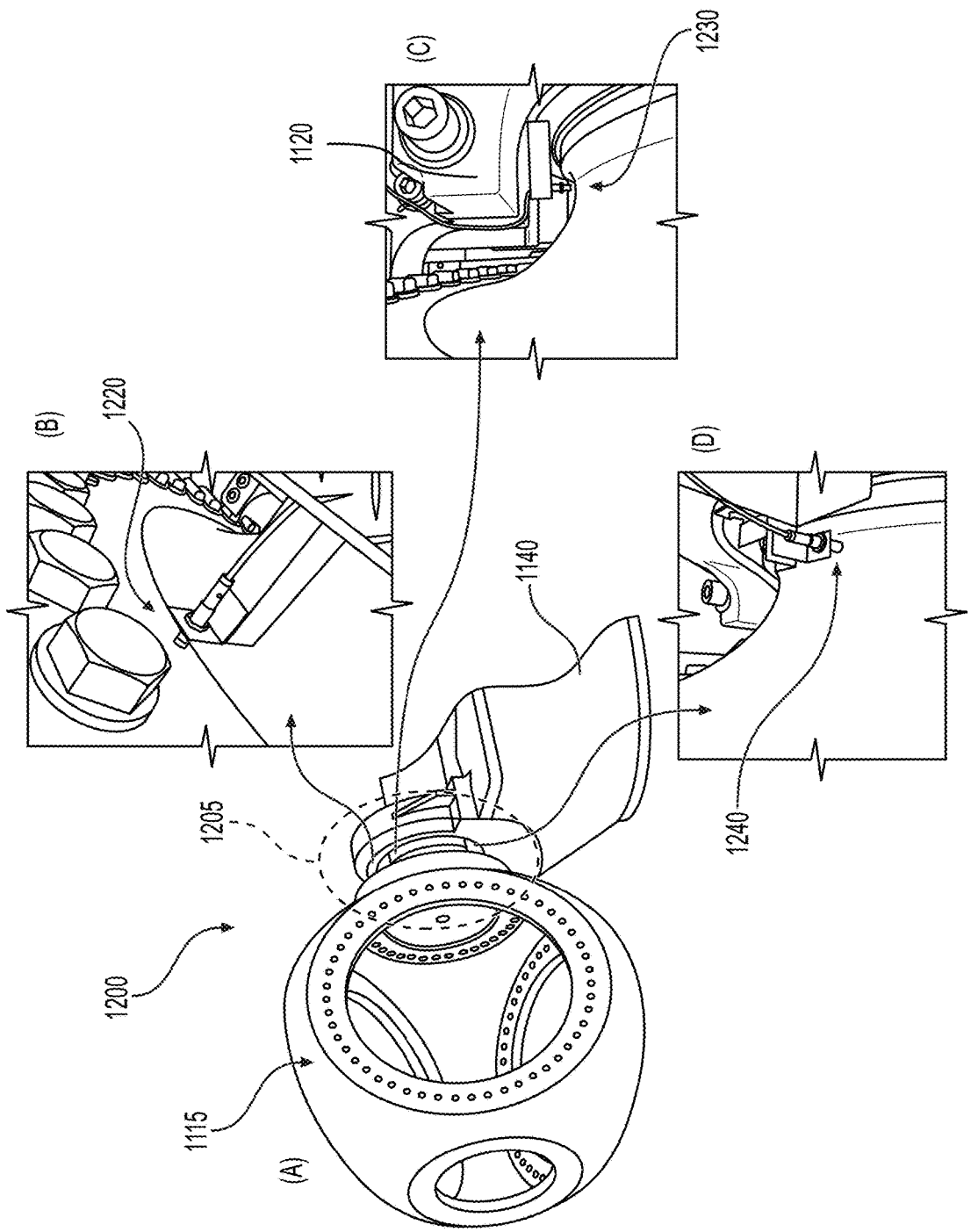
FIG. 12 shows a portion of the wind turbine of FIG. 11 including the blade hub attached to the main shaft seated in the main bearing and also shows the various non-contact proximity sensors associated with the main shaft and main bearing.

For example, FIG. 12 shows at (A) a portion 1200 of the wind turbine 1100 of FIG. 11 including the blade hub 1115 attached to the rotor 1105 seated in the main bearing 1120 and also shows at (B), (C), and (D the various non-contact proximity sensors associated with the rotor 1105 and main bearing 1120. Location 1205 includes the main bearing 1120 and the coupling of the rotor 1105 to the hub 1115. At location 1205, three non-contact proximity sensors are mounted to detect movement in three, mutually orthogonal axes, i.e., the axial direction along the axis of the rotor 1105, the horizontal direction, and the vertical direction (see mutually orthogonal axes shown in FIG. 11). A first non-contact proximity sensor 1220 is shown at (B) and is mounted oriented toward the coupling of the rotor 1105 to the hub 1115 to detect movement in the axial direction. A second non-contact proximity sensor 1230 is shown at (C) and is mounted to a surface of the main bearing 1120 and is oriented vertically toward the coupling of the rotor 1105 to the hub 1115 to detect movement in the vertical direction. A third non-contact proximity sensor 1240 is shown at (D) and is mounted oriented horizontally toward the coupling of the rotor 1105 to the hub 1115 to detect movement in the horizontal direction.

Figure 13:
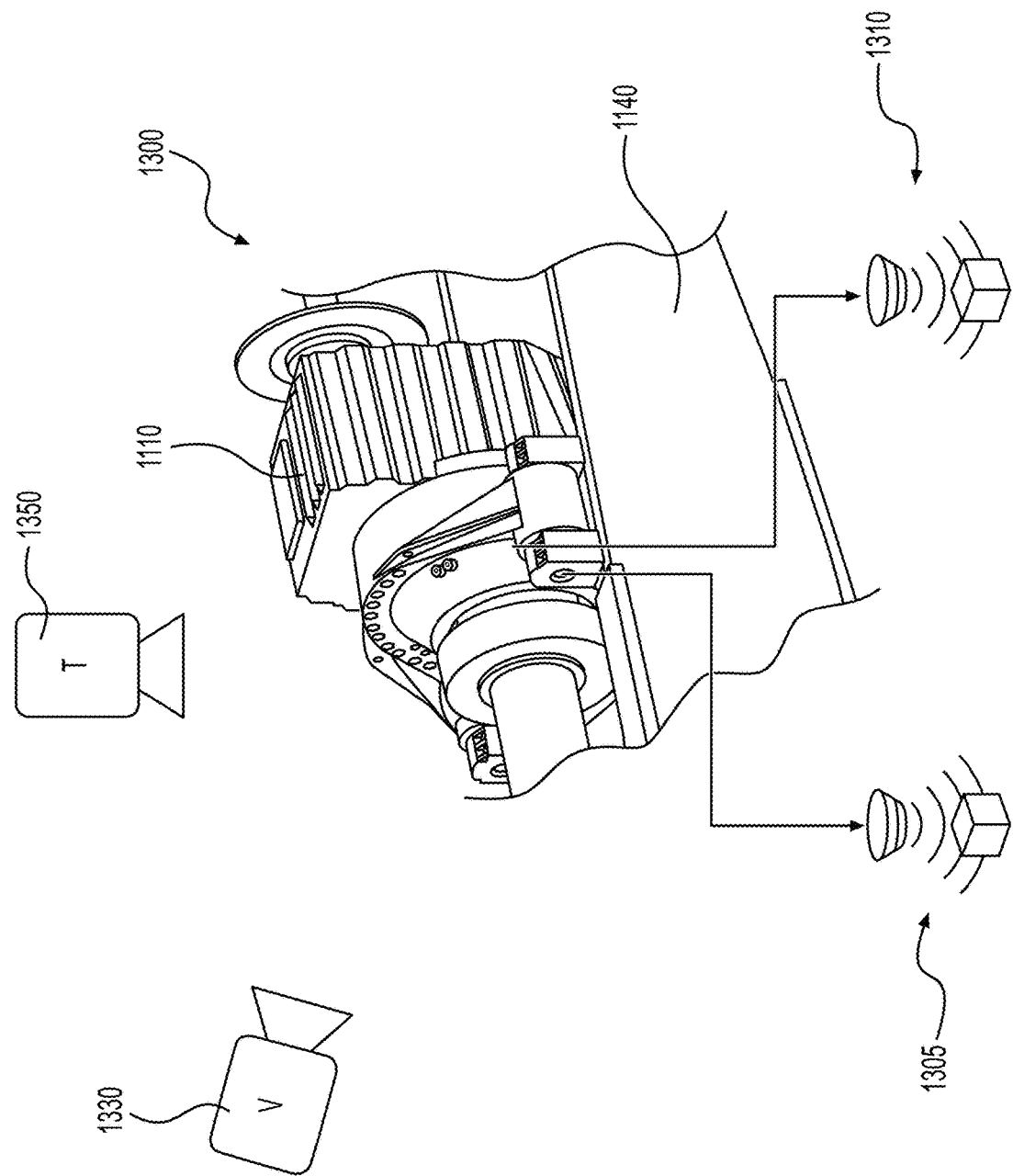
FIG. 13 shows a portion of the wind turbine of FIG. 11 including the gearbox and also shows various non-contact proximity sensors, a visual image camera, and a thermal image camera associated with the gearbox.

FIG. 13 shows a portion 1300 of the wind turbine 1100 of FIG. 11 including the gearbox 1110 and also shows various non-contact proximity sensors 1305, 1310, a visual image camera 1330, and a thermal image camera 1350 associated with the gearbox 1110. A first non-contact proximity sensor 1305 is mounted on an end face of the pin of the pin mount system by which the gearbox 1110 is attached to the bedplate 1140 is oriented vertically toward a bottom surface of the bed plate 1140 or of the nacelle to detect movement in the vertical direction. A second non-contact proximity sensor 1305 is mounted on a surface of the pin housings 1150, such as an interior facing surface, and is oriented toward a surface of the torque arm 1155 of the gearbox 1110 to detect movement in the axial direction.

Visual image camera 1330 is mounted to have a field of view that is oriented axially rearward from the main bearing 1120 toward the forward side (i.e., the blade side) of the gearbox 1110. Visual image camera 1330 can be mounted, for example, to an interior surface of the nacelle. Visual image camera 1330 can have one or more of a pan, tilt and zoom function and can be remotely operated. Imagery and/or data from the visual image camera 1330 can be cross-referenced to data from the first non-contact proximity sensor 1305 to monitor vertical movement of the gearbox 1110.

Thermal image camera 1350 is mounted to have a field of view that is oriented toward the gearbox 1110. Thermal image camera 1350 can be mounted, for example, to an interior surface of the nacelle and can be oriented vertically toward the gearbox 1110. Thermal image camera 1350 can have one or more of a pan, tilt and zoom function and can be remotely operated. In exemplary embodiments, thermal image camera 1350 can be operated to have variously within its field of view the region of the gearbox 1110 housing the reduction gears and the oil filter housing. Thermal variation detected by the thermal image camera 1350 can be indicative of reduced cooling oil flow, dirty cooling oil, misalignment of reduction gears, a mechanical failure within the gearbox, and so forth.

Figure 14:
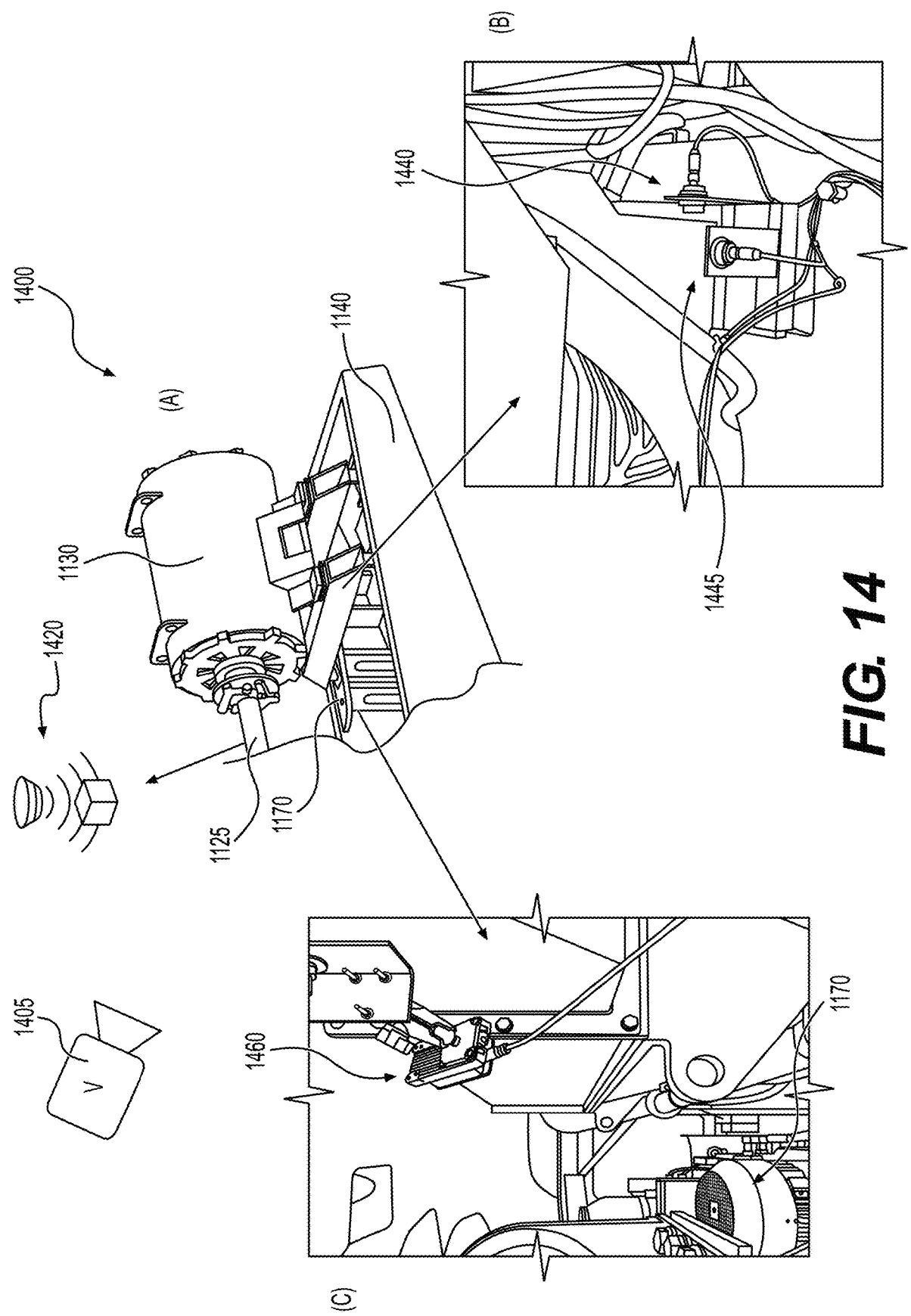
FIG. 14 shows a portion of the wind turbine of FIG. 11 including the high speed shaft, the generator, and the hydraulic station and also shows the various non-contact proximity sensors a thermal image camera associated with the generator, the non-contact proximity sensor associated with the high speed coupling, and a thermal image camera associated with the hydraulic station.

FIG. 14 shows at (A) a portion 1400 of the wind turbine 1100 of FIG. 11 including the high speed shaft 1125, the generator 1130, and the hydraulic station 1170 and also shows at (A) the visual image camera 1405 and the non-contact proximity sensor 1420 associated with the high speed shaft 1125, at (B) the non-contact proximity sensors 1440, 1445 associated with the generator 1130, and at (C) a thermal image camera 1460 associated with the hydraulic station 1170.

Looking at (A), a first non-contact proximity sensor 1420 is mounted on a surface of the nacelle and is oriented toward a surface of the coupling shaft that connects the first main shaft portion to the second main shaft portion to detect movement in the vertical direction. Also shown in (A), visual image camera 1460 is mounted to have a field of view that is oriented toward a surface of the coupling shaft that connects the first main shaft portion to the second main shaft portion to detect movement in the vertical direction. Visual image camera 1405 can be mounted, for example, to an interior surface of the nacelle and can have one or more of a pan, tilt and zoom function and can be remotely operated. In exemplary embodiments, visual image camera 1460 can be operated to have variously within its field of view the connections of the coupling shaft to the other portions of the high speed shaft 1125. One failure mode of the connections of the coupling shaft to the other portions of the high speed shaft 1125 is axial misalignment that leads to the couplings having a visible wobble during rotation. Additionally, the wobble plastically deforms the couplings producing a S-shape as seen in a side view. The visual image camera 1460 can be operated to observe one or more of these phenomena, both while the coupling shaft rotates and while the coupling shaft is stationary.

The mounting of the generator 1130 to the bedplate 1140 is shown at (B). A first non-contact proximity sensor 1440 is mounted, such as on a bracket, and is oriented along the horizontal axis toward a first surface of the generator 1130, such as a surface of the footing, to detect movement in the horizontal direction. A second non-contact proximity sensor 1445 is also mounted, such as on a bracket, and is oriented horizontally toward a second surface of the generator 1130, such as a surface of the footing, to detect movement in the axial direction. In some embodiments, a total of two non-contact proximity sensors are associated with the generator, such as the two non-contact proximity sensors shown at (B). In other embodiments, a total of four non-contact proximity sensors are associated with the generator, with two non-contact proximity sensors at locations of the generator 1130 on opposite sides of the axis of rotation of the high speed shaft, preferably at opposite corners of the generator 1130. Using four non-contact proximity sensors allows for detection of any twist or bow associated with the rotation of the high speed shaft and rotor of the generator 1130 that can cause non-synchronous vibration of the generator 1130.

The thermal image camera 1460 associated with the hydraulic station 1170 is shown at (C). The thermal image camera 1460 is mounted to have a field of view that is oriented toward the hydraulic station 1170, particularly of the hydraulic manifold. Thermal image camera 1460 can be mounted, for example, on a surface of the nacelle and can have one or more of a pan, tilt and zoom function and can be remotely operated.

Figure 15:
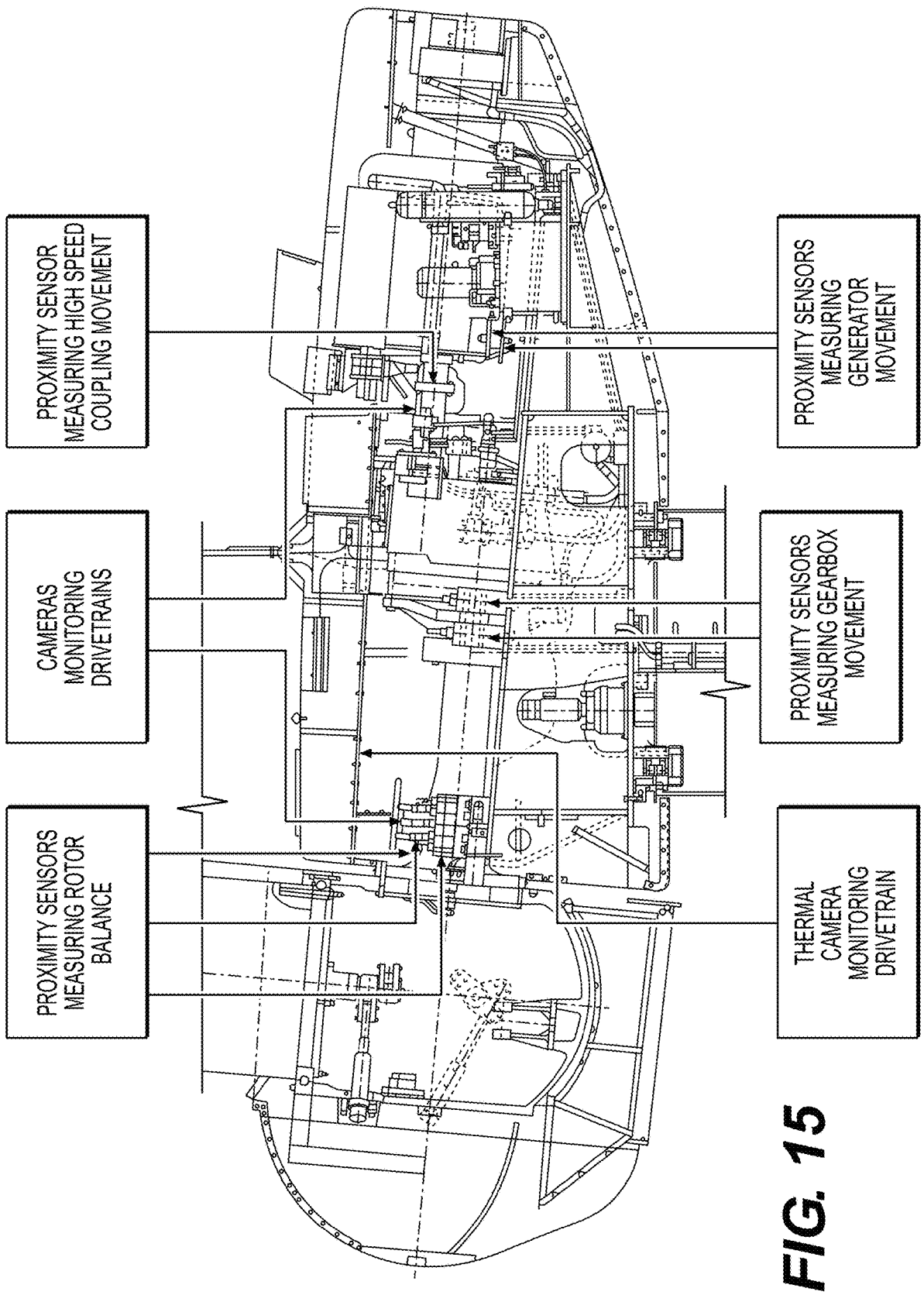
FIG. 15 is cross-sectional, side view of components of an embodiment of a wind turbine internal to the nacelle and identifies the type and location of various sensors and the component being monitored be each.
Figure 16:
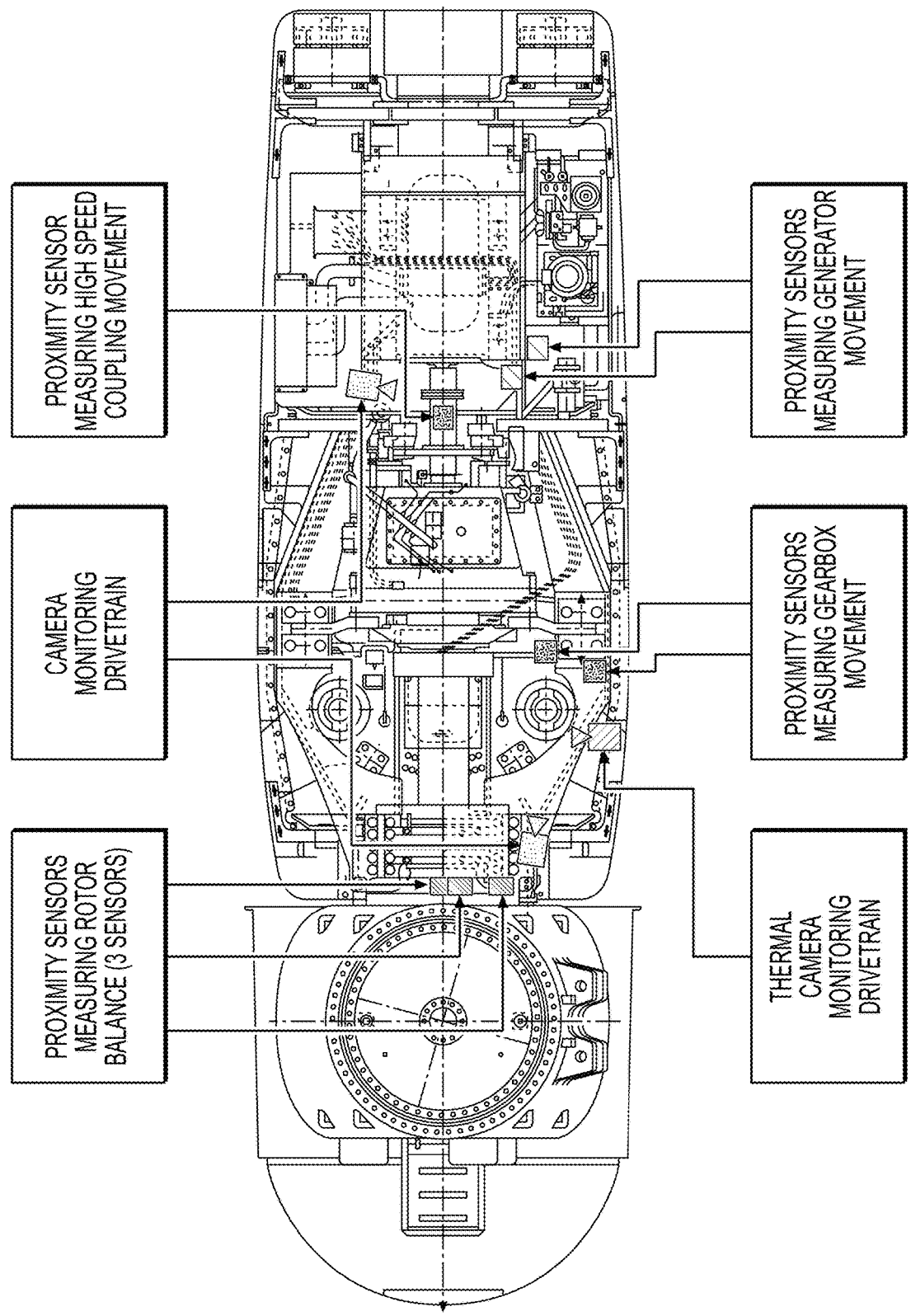
FIG. 16 is cross-sectional, top view of components of an embodiment of a wind turbine internal to the nacelle and identifies the type and location of various sensors and the component being monitored be each.

FIG. 15 is cross-sectional, side view of components of an embodiment of a wind turbine. FIG. 16 is cross-sectional, top view of components of an embodiment of a wind turbine. The views in both FIG. 15 and FIG. 16 are internal to the nacelle and identifies the type and location of various sensors and the component being monitored be each.

The various sensors enable monitoring of various performance aspects of the components of the wind turbine. Further, monitored performance aspects can be used to inform operation, maintenance, repair, and replacement of components of the wind turbine.

For example, measurements of the rotor 1105 in the axial direction, i.e., first non-contact proximity sensor 1220, provide information related aerodynamic imbalance, which can be indicative of a mechanical or hydraulic failure in the blade pitch system of the wind turbine. Also for example, measurements of the rotor 1105 in the vertical and horizontal direction, e.g., second non-contact proximity sensor 1230 and third non-contact proximity sensor 1240, provide information related to mass imbalance, which can be indicative of a issues such as excess ice on wind turbine blades or a plugged blade drain hole where a blade has water or hydraulic fluid inside or a blade repair that was not done appropriately. Together, the measurements of the rotor 1105 in the three directions provide indications of forces and misalignments that may be transferred to the next component in the drivetrain of the wind turbine, in this case the gearbox, which can affect the gearbox mechanically as well as impact efficiency and performance of the wind turbine.

For example, thermal image camera 1350 monitoring of the gearbox 1110 provides information indicative of an overheating condition, or a mechanical or cooling fluid (e.g., oil) related failure. Also, for example, visual image camera 1330 monitoring of the gearbox 1110 can be used to corroborate information from the gearbox non-contact proximity sensors.

Measurements and monitoring of the high speed shaft 1125 provides information on alignment of the sections, i.e., first main shaft portion, second main shaft portion, and coupling shaft, of the high speed shaft 1125. Misalignment results in vibrations that are detected by the non-contact proximity sensor 1420. Information from visual image camera 1405 can be used to corroborate information from non-contact proximity sensor 1420. Furthermore, visual image camera 1405 allows inspection of the high speed shaft 1125 for signs of misalignment even when the high speed shaft 1125 is in a stationary/non-operative condition.

As further examples, non-contact proximity sensors associated with the generator 1130 monitor generator performance and detects faults and failures in generator components. For example, non-contact proximity sensors associated with the generator 1130 detect movement at the generator footings, which also relates to whether the alignment of the high speed shaft 1125 or drivetrain is within specification, both during operation and non-operation. Non-contact proximity sensors associated with the generator 1130 also detect the aggregate effect of system faults, such as misalignments and vibrations, in drivetrain. Information from visual image camera 1405 can also be used to corroborate information from non-contact proximity sensors associated with the generator 1130.

Also for example, thermal image camera 1460 monitoring of the hydraulic station 1170 provides information indicative of a hydraulic failure, a leak or clog, an overheating condition, or a loss of fluid related failure.

Furthermore, two or more of the visual, thermal, and vibration measurements on a single component or from two or more different components can be correlated to indicate mechanical issues, and the non-contact proximity sensors can help isolate and localize mechanical issue, such as to mounting system or a coupling or to gears.

Measurements on one component can also be correlated with measurements on a second component to monitor performance aspects. For example, measurements of the rotor 1105 in the three directions and measurements of movement of the gearbox 1110, e.g., non-contact proximity sensor 1305 and non-contact proximity sensor 1310, can be used to detect torque arm 1155 looseness, gain insight to the gearbox 1110 alignment with the generator 1130, and assess gearbox health. Additionally, these measurements along with information from visual image camera 1330 and thermal image camera 1350 provide an indication of expected life of the gearbox 1110.

Measurements and information from any of the above sensors and cameras can be augmented by input from the Original Equipment Manufacturer (OEM) sensors of the wind turbine.

Data from the disclosed measurement points, optionally along with the data available from wind turbine OEM monitoring equipment, allow Machine Learning and Artificial Intelligence (AI/ML) Models to be created. The AI/ML models utilize anomaly detection algorithms, such as Advanced Pattern Recognition (APR), k-Nearest Neighbor, Moving Windows Principle Components Analysis (MWPCA), and Minimum Viable Product (MVP Model). The AI/ML models enable operations teams to be notified when a particular component, such as a main bearing 1120, a gearbox 1110, a generator 1130, the hub 1115 or turbine blade, hydraulic equipment, and cooling equipment, requires maintenance, repair or replacement. Additionally, the AI/ML Models allow prediction of an expected useful life of a component and provide future predictive modeling, such as predictions one year in advance.

While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A system for determining an operating condition for a wind turbine including a nacelle having therein a rotor, a generator, and a gearbox connected to the generator by a first coupling, the system comprising:
    a first plurality of non-contact proximity sensors that are mounted adjacent to the rotor for measuring rotor displacement in mutually orthogonal directions;
    a second plurality of non-contact proximity sensors that are mounted for measuring gearbox displacement in at least two orthogonal directions;
    a third plurality of non-contact proximity sensors that are mounted for measuring generator displacement in at least two orthogonal directions;
    a plurality of visual image cameras, a first visual image camera of the plurality of visual image cameras having a field of view oriented axially rearward from a main bearing toward a forward side of the gearbox and a second visual image camera of the plurality of visual image cameras having a field of view oriented toward a surface of the first coupling, wherein the first visual image camera monitors vertical movement of the gearbox and the second visual image camera monitors vertical movement of the first coupling; and
    at least one of a first thermal camera having a field of view oriented toward the gearbox and optionally, a second thermal camera having a field of view oriented toward a hydraulic station,
    wherein the rotor is attached by a second coupling to a hub to which blades of the wind turbine are attached, and
    wherein the first plurality of non-contact proximity sensors include:
    a first non-contact proximity sensor mounted oriented toward the second coupling to detect movement in an axial direction,
    a second non-contact proximity sensor mounted to a surface of the main bearing and oriented vertically toward the second coupling to detect movement in a vertical direction, and
    a third non-contact proximity sensor mounted oriented horizontally toward the second coupling to detect movement in a horizontal direction.

2. The system according to claim 1, further comprising:
    a first processor connected to receive sensor data from each of the first plurality of non-contact proximity sensors, the second plurality of non-contact proximity sensors, and the third plurality of non-contact proximity sensors, wherein the first processor is configured to partition the received sensor data into predefined datasets; and
    a second processor configured to format the predefined datasets and to transmit the formatted predefined datasets over a network to a processing computer.

3. The system according to claim 2, wherein the first processor is connected to receive sensor data from each of the plurality of visual image cameras and from the at least one of the first thermal camera and the second thermal camera.

4. The system according to claim 2, wherein the processing computer is configured to process the formatted predefined datasets to analyze the operating condition of the wind turbine to determine whether a measured displacement is within an accepted range, wherein the measured displacement is one or more of a measured rotor displacement, a measured gearbox displacement, or a measured generator displacement, and
    wherein the processing computer is configured to notify to a user an indication of a defect when the measured displacement is not within an accepted range.

5. The system according to claim 2, wherein the processing computer is configured to display data from the formatted predefined dataset on a display to allow the user to select one or more of the first plurality of non-contact proximity sensors, the second plurality of non-contact proximity sensors, and the third plurality of non-contact proximity sensors for evaluating components of the wind turbine.

6. A computing device connected in combination with the system according to claim 2, the computing device comprising a third processor configured to receive the predefined datasets of sensor data from the second processor and determine whether any of the displacements are outside accepted ranges.

7. The system according to claim 1, wherein the gearbox is attached to a bedplate by a pin mount system, and
wherein the second plurality of non-contact proximity sensors include:
a fourth non-contact proximity sensor mounted on an end face of a pin of the pin mount system, where the fourth non-contact proximity sensor is oriented vertically toward a bottom surface of the bedplate or of the nacelle to detect movement in the vertical direction, and
a fifth non-contact proximity sensor mounted on a surface of a pin housing, where the fifth non-contact proximity sensor is oriented toward a surface of a torque arm of the gearbox to detect movement in the axial direction.

8. The system according to claim 7, wherein the surface of the pin housing is an interior facing surface.

9. A system for determining an operating condition for a wind turbine including a nacelle having therein a rotor, a generator, and a gearbox connected to the generator by a first coupling, the system comprising:
a first plurality of non-contact proximity sensors that are mounted adjacent to the rotor for measuring rotor displacement in mutually orthogonal directions;
a second plurality of non-contact proximity sensors that are mounted for measuring gearbox displacement in at least two orthogonal directions; and
a third plurality of non-contact proximity sensors that are mounted for measuring generator displacement in at least two orthogonal directions,
wherein the rotor is attached by a second coupling to a hub to which blades of the wind turbine are attached, and
wherein the first plurality of non-contact proximity sensors include:
a first non-contact proximity sensor mounted oriented toward the second coupling to detect movement in an axial direction,
a second non-contact proximity sensor mounted to a surface of a main bearing and oriented vertically toward the second coupling to detect movement in a vertical direction, and
a third non-contact proximity sensor mounted oriented horizontally toward the second coupling to detect movement in a horizontal direction.

10. The system according to claim 9, further comprising:
a first visual image camera having a field of view oriented axially rearward from the main bearing toward a forward side of the gearbox, wherein the first visual image camera monitors vertical movement of the gearbox; and
a first thermal camera having a field of view oriented toward the gearbox.

11. The system according to claim 10, further comprising:
a second visual image camera having a field of view oriented toward a surface of the first coupling, wherein the second visual image camera monitors vertical movement of the first coupling;
a second thermal camera having a field of view oriented toward a hydraulic station;
a first processor connected to receive sensor data from each of the first plurality of non-contact proximity sensors, the second plurality of non-contact proximity sensors, and the third plurality of non-contact proximity sensors, wherein the first processor configured to partition the received sensor data into predefined datasets;
a second processor configured to format the predefined datasets and to transmit the formatted predefined datasets over a network to a processing computer; and
an interface for collecting the sensor data as real-time data, wherein the first processor is configured to receive the sensor data from the interface.

12. The system according to claim 9, further comprising a second visual image camera having a field of view oriented toward a surface of the first coupling, wherein the second visual image camera monitors vertical movement of the first coupling.

13. The system according to claim 9, further comprising a second thermal camera having a field of view oriented toward a hydraulic station.

14. The system according to claim 9, further comprising:
a first processor connected to receive sensor data from each of the first plurality of non-contact proximity sensors, the second plurality of non-contact proximity sensors, and the third plurality of non-contact proximity sensors, wherein the first processor is configured to partition the received sensor data into predefined datasets; and
a second processor configured to format the predefined datasets and to transmit the formatted predefined datasets over a network to a processing computer.

15. The system according to claim 14, further comprising an interface for collecting the sensor data as real-time data, wherein the first processor is configured to receive the sensor data from the interface.

16. The system according to claim 9, further comprising:
a second visual image camera having a field of view oriented toward a surface of the first coupling, wherein the second visual image camera monitors vertical movement of the first coupling;
a second thermal camera having a field of view oriented toward a hydraulic station;
a first processor connected to receive sensor data from each of the first plurality of non-contact proximity sensors, the second plurality of non-contact proximity sensors, and the third plurality of non-contact proximity sensors, wherein the first processor configured to partition the received sensor data into predefined datasets;
a second processor configured to format the predefined datasets and to transmit the formatted predefined datasets over a network to a processing computer; and
an interface for collecting the sensor data as real-time data, wherein the first processor is configured to receive the sensor data from the interface.

17. A method for determining an operating condition for a wind turbine including a nacelle having a rotor, a generator, and a gearbox connected to the generator by a first coupling, the method comprising:
receiving data by a processor from at least one of a plurality of sensors mounted within the nacelle of the wind turbine, the at least one of the plurality of sensors being a first plurality of non-contact proximity sensors measuring rotor displacement in mutually orthogonal directions;
partitioning the received sensor data into predefined datasets;
formatting the predefined datasets for transmission over a network;
transmitting the formatted predefined datasets from the processor over the network to a processing computer;
processing in the processing computer the formatted predefined datasets to analyze an operating condition of the wind turbine to determine whether the measured rotor displacement is within an accepted range; and notifying, by the processing computer, to a user an indication of a defect when the measured rotor displacement is not within an accepted range, wherein the rotor is attached by a second coupling to a hub to which blades of the wind turbine are attached, and wherein the first plurality of non-contact proximity sensors include:

a first non-contact proximity sensor mounted oriented toward the second coupling to detect movement in an axial direction, a second non-contact proximity sensor mounted to a surface of a main bearing and oriented vertically toward the second coupling to detect movement in a vertical direction, and a third non-contact proximity sensor mounted oriented horizontally toward the second coupling to detect movement in a horizontal direction.

18. The method of claim 17, further comprising:

receiving data from at least a second plurality of sensors mounted within the nacelle of the wind turbine, the at least second plurality of sensors being a second plurality of non-contact proximity sensors measuring gearbox displacement in at least two orthogonal directions;

receiving data from at least a third plurality of sensors mounted within the nacelle of the wind turbine, the at least third plurality of sensors being a third plurality of non-contact proximity sensors measuring generator displacement in at least two orthogonal directions;

receiving data from a thermal camera for measuring a temperature of one of the rotor, the generator, and the gearbox; and displaying by the processing computer on a display data from the predefined formatted dataset to allow the user to select one or more of the plurality of sensors for evaluating components of the wind turbine.

19. The method of claim 17, further comprising receiving data from at least a second plurality of sensors mounted within the nacelle of the wind turbine, the at least second plurality of sensors being a second plurality of non-contact proximity sensors measuring gearbox displacement in at least two orthogonal directions.

20. The method of claim 19, further comprising receiving data from at least a third plurality of sensors mounted within the nacelle of the wind turbine, the at least third plurality of sensors being a third plurality of non-contact proximity sensors measuring generator displacement in at least two orthogonal directions.

21. The method of claim 17, further comprising receiving data from a thermal camera for measuring a temperature of one of the rotor, the generator, and the gearbox.

22. The method of claim 17, further comprising displaying by the processing computer on a display data from the predefined formatted dataset to allow the user to select one or more of the plurality of sensors for evaluating components of the wind turbine.

23. The method according to claim 17, further comprising:

receiving data from a thermal camera for measuring a temperature of one of the rotor, the generator, and the gearbox; and displaying by the processing computer on a display data from the predefined formatted dataset to allow the user to select one or more of the plurality of sensors for evaluating components of the wind turbine.

* * * * *